United States Patent [19]

Steffens et al.

[11] Patent Number: 5,653,491

[45] Date of Patent: Aug. 5, 1997

[54] FOLDING CARGO BAY COVER FOR PICKUP TRUCKS

[75] Inventors: Chuck J. Steffens, Grand Rapids; John Kooiker, Caledonia, both of Mich.

[73] Assignee: Steffens Enterprises, Inc., Grand Rapids, Mich.

[21] Appl. No.: 528,943

[22] Filed: Sep. 15, 1995

[51] Int. Cl.$^6$ ................................................ B60P 7/02
[52] U.S. Cl. ........................... 296/100; 160/187; 160/213; 160/229.1
[58] Field of Search ............................ 296/100, 210, 296/219; 160/32, 35, 36, 130, 187, 210, 213, 229.1

[56] References Cited

U.S. PATENT DOCUMENTS

| | | | |
|---|---|---|---|
| 2,086,091 | 7/1937 | Payette | 296/100 |
| 3,300,265 | 1/1967 | Wilmer et al. | 312/303 |
| 3,416,835 | 12/1968 | Ohle | 296/100 |
| 3,512,828 | 5/1970 | Craft | 296/100 |
| 3,649,072 | 3/1972 | Cross | 296/100 |
| 3,651,540 | 3/1972 | Rana | 16/251 |
| 3,768,858 | 10/1973 | Boismier | 296/100 |
| 3,833,255 | 9/1974 | Logue | 296/101 |
| 3,986,749 | 10/1976 | Hull et al. | 296/100 |
| 4,199,188 | 4/1980 | Albrecht et al. | 296/100 |
| 4,221,423 | 9/1980 | Stone | 296/100 |
| 4,313,636 | 2/1982 | Deeds | 296/100 |
| 4,406,493 | 9/1983 | Albrecht et al. | 296/100 |
| 4,418,954 | 12/1983 | Buckley | 296/100 |
| 4,747,441 | 5/1988 | Apolzer et al. | 160/206 |
| 4,824,162 | 4/1989 | Geisler et al. | 296/100 |
| 4,844,531 | 7/1989 | Kooiker | 296/100 |
| 4,861,092 | 8/1989 | Bogard | 296/100 |
| 4,946,217 | 8/1990 | Steffens et al. | 296/100 |
| 5,087,093 | 2/1992 | Repetti | 296/100 |

*Primary Examiner*—Andrew C. Pike
*Attorney, Agent, or Firm*—Price, Heneveld, Cooper, DeWitt & Litton

[57] ABSTRACT

A cargo bay cover for a cargo bay of a pickup truck includes at least first and second cargo bay panels arranged generally parallel to each other, each configured to span the cargo bay of the pickup truck with opposite ends resting on opposite sidewalls of the cargo bay, a hinge interconnecting the first and second cargo bay panels in a manner such that the first and second cargo bay panels can be rotated about the hinge and folded onto the other of the first and second cargo bay panels, and a bracket assembly interconnecting the hinge to the opposite sidewalls of the cargo bay for retaining the first and second cargo bay panels above the cargo bay, the bracket assembly having at least one flange pivotally depending from the hinge proximate to and secured to at least one of the sidewalls.

20 Claims, 5 Drawing Sheets

FOLDING CARGO BAY COVER FOR PICKUP TRUCKS

FIELD OF THE INVENTION

This invention relates to covers for the cargo bed of a pickup truck, more particularly to a cover consisting of a plurality of rigid panels which may be folded to cover and uncover the cargo space of the truck bed.

BACKGROUND OF THE INVENTION

The cargo space or bed of a conventional pickup truck is open and, therefore, unprotected from the weather. This can present a serious problem for some types of cargo. This problem has been addressed in a number of ways in the past. One solution has been to provide a flexible cover of watertight material, such as canvas, which has been treated with a moisture sealing material or a plastic. Attachments have been provided on the sides of the cargo space to tie down the cover. A disadvantage associated with this arrangement is that access to the cargo space is achieved by detaching and removing the flexible cover. The canvas is reattached to the various hooks to recover the bed. This process is time consuming and cumbersome.

Another solution has been to provide a rigid roof structure which is placed over the cargo bay and bolted, clamped, or otherwise rigidly secured to the cargo bay. This camper-top type of structure normally has a rear door which is positioned above and cooperates with the tailgate of the cargo space. The only access to the cargo area of the truck is exclusively provided through the rear opening provided by pivoting the rear door and tailgate panel to an open position. This can be very inconvenient when the operator must remove or crawl over other objects to reach something at the cab end of the bed.

Yet another solution to protect cargo in the truck bed has been a flexible cover supported on rigid cross pieces which are mounted on rails secured to the sides of the cargo space for fore and aft movement. This latter type of cover can be folded forwardly against the rear wall of the vehicle cab to expose the cargo bay. However, the disadvantage of this system is that to access objects near the cab of the truck, the cover needs to be opened entirely and again refastened using the numerous snaps and/or hooks to close the cover.

Lastly, another cover for the bed of the pickup used a number of panels mounted to the siderails of the truck bed and configured to slide in telescoping arrangement with each other to cover and uncover the cargo bay. In order to gain access to a portion of the bed closest to the cab, the panels needed to be fully telescoped together. That is to say, an intermediate panel cannot be opened by itself.

All of the above structures have one or more disadvantages including complexity, operational inconvenience, or relatively high cost. None of the above structures provide great flexibility in accessing any portion of the truck bed. In particular, none of the prior structures allow direct access to the forward portion of the bed with a single member to insure closure. Nor do any of the prior structures offer a cover which has a low profile, is substantially rigid, and does not require at least a portion of the cover being fixedly attached or in a stationary position to the siderails of the truck bed.

SUMMARY OF THE INVENTION

The invention provides a plurality of low profile panels which are relatively lightweight and can be quickly and easily folded, one upon the other, to gain access or expose the cargo bay and just as easily be unfolded to cover the cargo bay. The interconnected panels are retained on the siderails of the cargo bay by a bracket assembly retaining one of the hinges inter-connecting adjacent panels. Further, the invention provides a locating assembly which prevents the closed cover from laterally acting forces, such as cross wind or torque, possibly dislocating the cover. Because of its construction and low profile, the individual panels can be relatively lightweight thus making it easy to operate by a single person. Also, as a result of the low profile, even when folded to an open position, it provides a compact stack which is not substantially affected by the vehicle's slip stream nor does the cover obstruct the field of view through the truck back light.

The invention also provides an improved joint between each of the panels forming a water-resistant seal. It also provides an improved gasket arrangement to prevent moisture from finding its way into the cargo bay in the space between the wind guard which extends along the siderails of the truck adjacent the ends of the panels. The invention also provides a better seal at the ends of the hinges to further isolate the interior of the cargo bay from the exterior elements to which the truck is exposed.

These and other improvements and advantages of the invention will be appreciated by those skilled in the art upon reading the following description of the invention and reference to the attached drawing figures.

DETAILED DESCRIPTION OF THE PREFERRED EMBODIMENT

Figure 1:
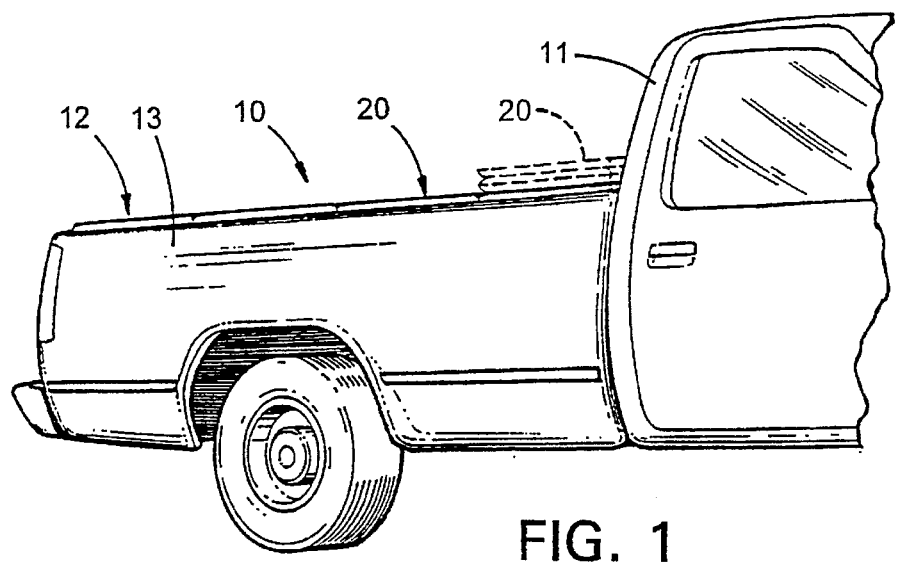
FIG. 1 is a fragmentary oblique side view of a pickup truck with the cover of this invention generally illustrated in an extended or closed condition in solid lines, and in a folded or open condition in broken lines.
Figure 2:
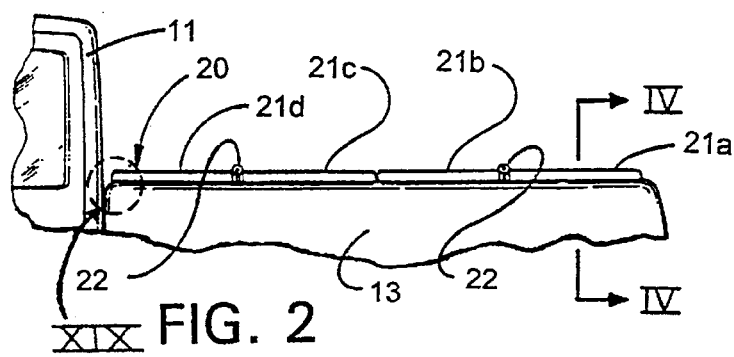
FIG. 2 is a fragmentary side view generally showing the cover in the extended or closed condition.
Figure 3:
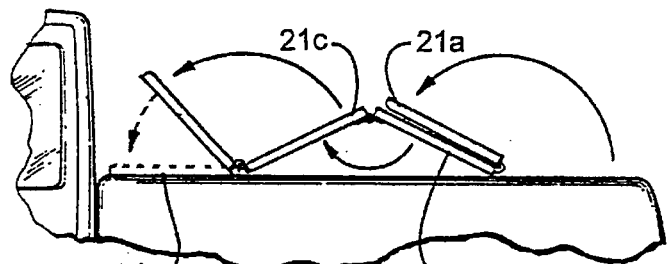
FIG. 3 is a view similar to FIG. 2 illustrating one embodiment or folding arrangement of the cover.
Figure 4:
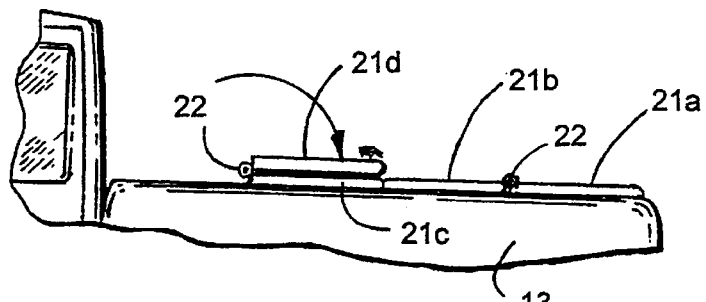
FIG. 4 is a fragmentary side view generally showing the cover with the panel closest the cab in an open position.
Figure 5:
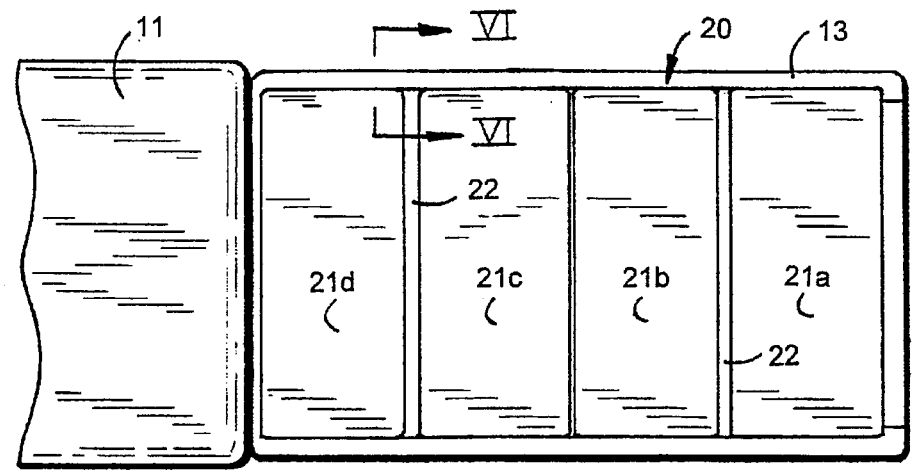
FIG. 5 is a plan view of one embodiment of the invention covering and closing the cargo compartment.

Referring to the drawing figures, the numeral 10 identifies a conventional pickup truck equipped with a cab 11 and a cargo bed or bay 12 having three sidewalls 13 joined by a fold-down tailgate. Mounted over the top of the cargo space of the bed is a cover 20 which, in FIG. 1, is illustrated in an extended or closed position in solid lines and in a retracted or open position in broken lines. The cover 20 includes several, and preferably four generally identical panels 21a, 21b, 21c, and 21d, joined to each other by hinges 22 (FIG. 2). Each hinge 22 has a central pin 23 (FIGS. 7 and 13) about which the leaves 23a pivot. The leaves 23a of the hinge are secured to the covers by a suitable fastener, such as rivets or screws. The hinges joining panels 21a, 21b and 21c, 21d are preferably arranged with the central pin 23 of the hinge extending along a lateral edge of one panel and located between the panels. The central pin of the hinge between panels 21b and 21c is preferably displaced slightly below the lower surface of the panels (FIG. 14). Thus, adjacent panels can be folded in opposite directions as shown in FIG. 3. Furthermore, the hinge arrangement permits the panel 21d closest to the cab to open, allowing access to the end of the bed (FIG. 4).

Figure 6:
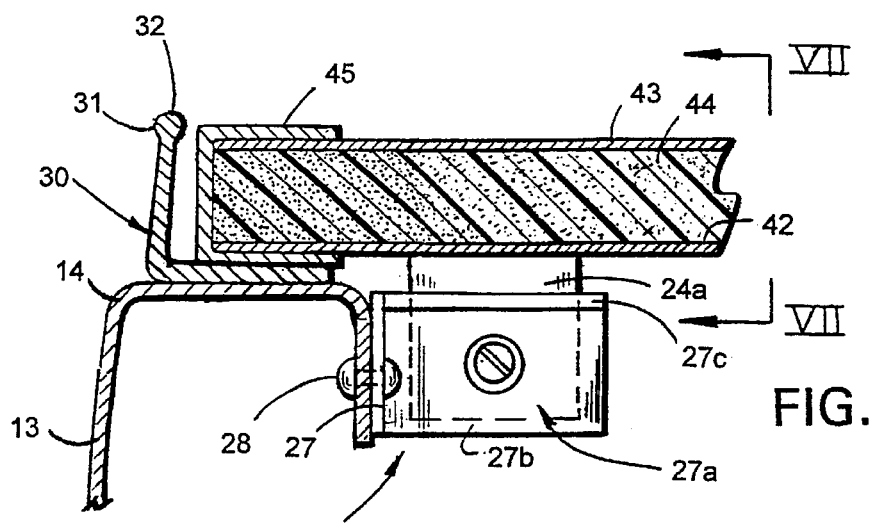
FIG. 6 is a fragmentary section view of the cover and one siderail taken along line VI—VI in FIG. 5.
Figure 7:
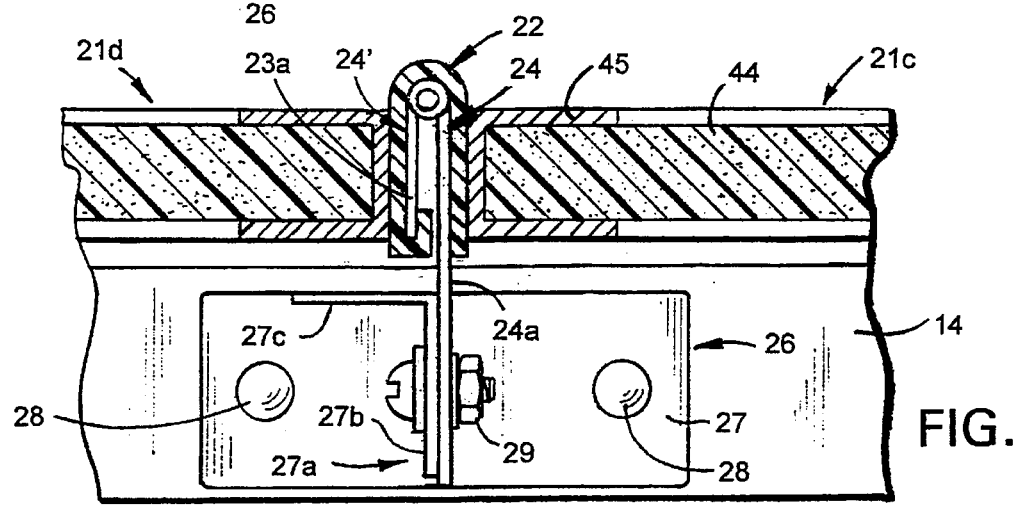
FIG. 7 is a fragmentary section view of the cover and one siderail taken along line VII—VII in FIG. 6.
Figure 8:
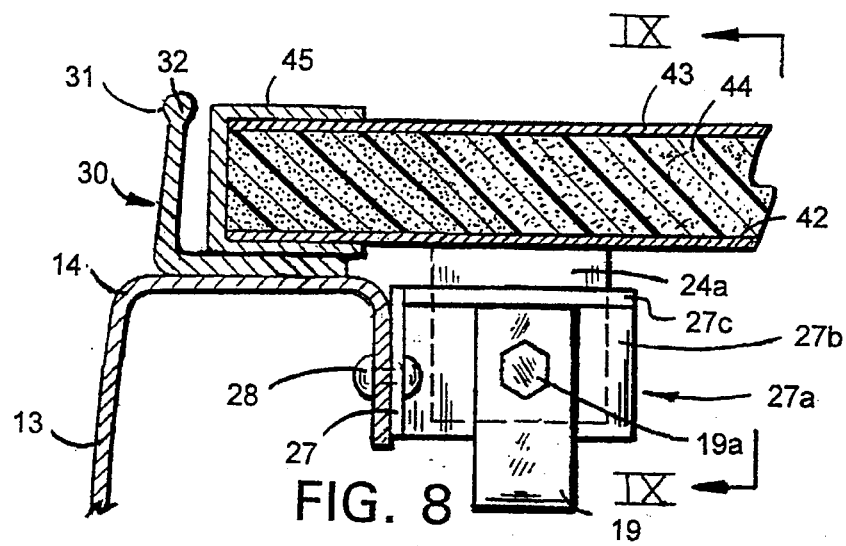
FIG. 8 is a fragmentary section view similar to that shown in FIG. 6 illustrating an alternate embodiment of the hold-down bracket.
Figure 9:
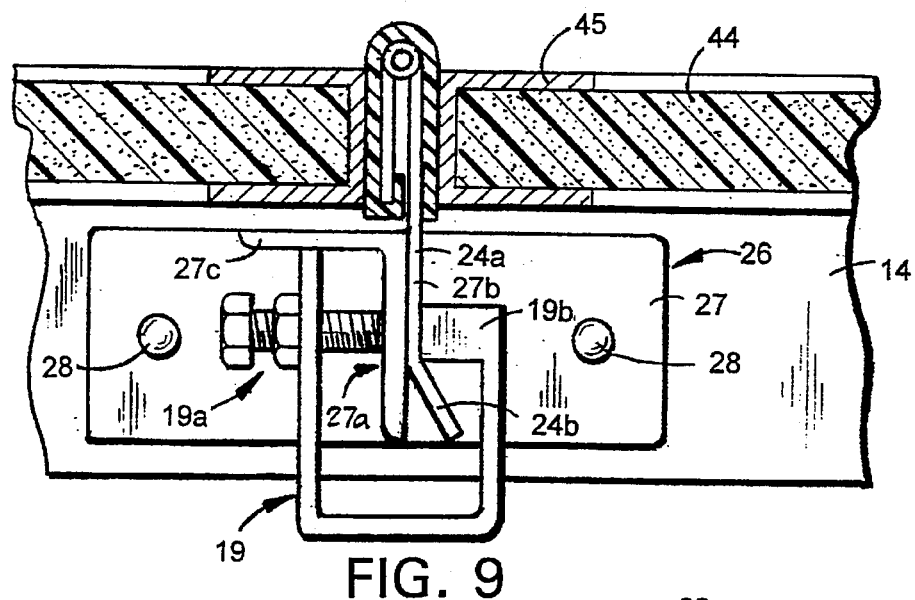
FIG. 9 is a fragmentary section view of the hold-down bracket taken along line IX—IX in FIG. 8.

Referring to FIGS. 6 and 7, at least one of the hinges 22, preferably the one closest to cab 11, includes a pair of flanges 24, 24' each pivotally joined at one end of the hinge. A portion 24a hangs freely and rotates independently below the hinge 22 and into the cargo bay proximate each of the siderails 14. Each flange 24a preferably includes a hole (not shown) configured to receive a fastener described below. Each flange 24a is connected to a mounting bracket 26 which includes a mounting plate 27 attached to the interior portion of siderail 14. Fasteners, such as rivet or bolts 28, hold the mounting plate 27 to the siderail 14. Other fasteners may also be used, such as screws or clamps as described below. Extending generally at a right angle from mounting plate 27 is a length of angle iron 27a having a generally vertically oriented flange 27b and a generally horizontally oriented flange 27c. The vertically oriented flange 27b of the angle iron 27a adjacent flange 24 includes a hole 29 configured to align with hole 25 in flange 24a. The relative positions of the flanges 27b and 24a can be securely maintained by a fastener, such as a bolt, passing through holes 25 and 29. As an alternative to the arrangement shown in FIGS. 6 and 7, holes 25, 29 in one or both of the flanges 24a and 27b can be replaced or substituted by one or more holes or slots aligned along a given line. With a series of holes or slots aligned at right angles to each other, a wide range of mounting positions can be achieved. A similar fastener can be used to secure the two flanges 24a and 27b together.

In yet another alternative construction or configuration of the bracket assembly shown in FIGS. 6 and 7, FIGS. 8 and 9 illustrate flanges 24a and 27b maintained in position relative to each other by a C-clamp 19, wherein a bolt 19a compresses the two flanges 24a, 27b against a leg 19b wrapping around or extending to the opposite side. This configuration does not require the alignment of holes, nor is it restrained by the dimensions of such holes, and thus offers the widest range of adjustment or compensation when mounting the cover assembly 20 to the truck bed 12. A bend 24b in flange 24a is provided to prevent withdrawal of flange 24a if clamp 19 loosens slightly. This same type of clamping arrangement may be used to attach the mounting plate 27 to the bed sidewall.

Although each of the embodiments of the mounting bracket illustrate a length of angle iron 27a extending generally horizontally from the siderail in the cargo space, it is contemplated that a second flange could extend generally perpendicularly from flange 24a and lie adjacent to and generally parallel to each siderail 14. In this configuration, no structure remains protruding into the cargo bay when cover 20 is removed. Similar types of fasteners can be used to achieve the proper relative location of cover 20 on siderails 14.

To protect cover 20 from cross winds, a generally L-shaped angle 30 (FIGS. 6 and 11) is secured to the top of siderails 14 on sides 13 of the cargo bed to shield the edges of the panels. Angle 30 may be an aluminum extrusion having an upright leg 31 inclined slightly inwardly to partially close the gap between it and the ends of the panels. The end of upright leg 31 can be provided with a bead 32 for strength and to provide a finished edge. In a preferred embodiment, L-shaped angles or brackets 30 are made from a rigid polyvinyl chloride (PVC) designated GEON® Brand 85857 available from B. F. Goodrich. As a result, bracket 30 is preferred extruded, and most preferably co-extruded with lip seals or flanges 35a, 35b made from a more flexible PVC material. The two lines of seals 35a, 35b provide a redundant sealing arrangement with panels 21a through 21d. It is also preferred that bracket 30 be attached to the upper edge or surface of siderail 14 using a double-sided adhesive tape, such as available from 3-M Company.

Figure 11:
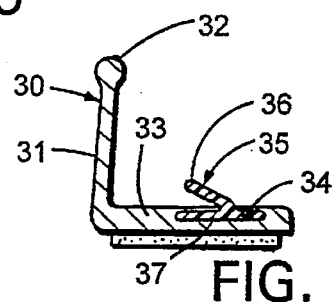
FIG. 11 is a section view of the wind barrier equipped with a moisture excluding gasket.
Figure 12:
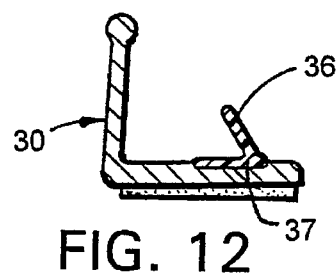
FIG. 12 illustrates another view of the wind barrier of FIG. 11 with another embodiment of a gasket or seal.

As shown in FIG. 11, horizontal leg 33 of the angle 30 adjacent the upper surface of siderail 14 may be provided with a channel 34 to mount resilient gasket 35. The gasket may have an upstanding finger 36 with gasket flange 37 seated in the lower portion of channel 34. By properly dimensioning the channel and the gasket and using a material having at least some lubricous surface characteristics, or coated with a lubricous material for purposes of installation, the gasket can be assembled to angle 30 by sliding it lengthwise in the channel. FIG. 12 illustrates yet an alternate construction in which base flange 37 of the gasket is only partially recessed into the upper surface of the horizontal leg 33. In this case, the gasket is bonded to angle 30 by a suitable weather-resistant bonding agent, the choice of which will depend upon its ability to adhere to both aluminum and the polymer from which gasket 35 is formed. Various adhesives suitable for this purpose are commercially available.

Figure 10:
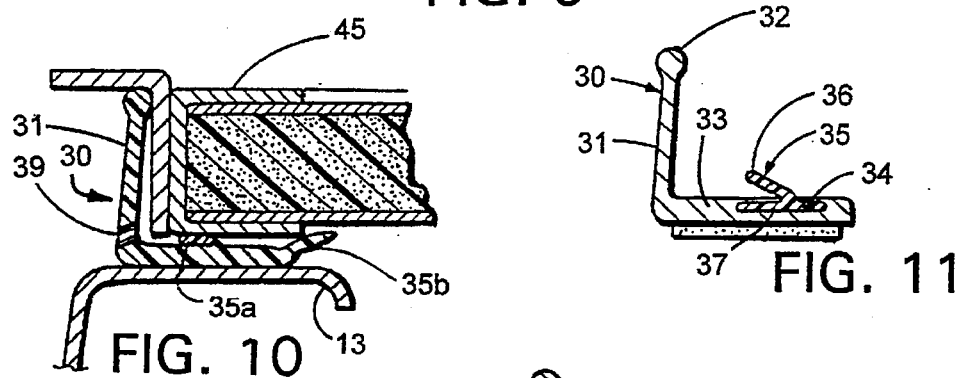
FIG. 10 is an enlarged, fragmentary section view through a siderail of the truck bed illustrating one construction of the invention in a closed position.

The angle at which finger 36 extends upwardly will, in part, depend upon the resiliency of the gasket. The purpose is to provide a water-resistant seal with the closed cover. It is preferred that finger 36 be inclined outwardly, thus providing a seal which is particularly resistant to moisture migration between the seal and the cover. To avoid accumulation of moisture within angle 30 between upright leg 31 and gasket 35, drain openings 39 may be provided at suitable spacing at the base of upright leg 31 (FIG. 10). These openings may be inclined rearwardly in an outward direction to create an outward flow pattern.

Figure 13:
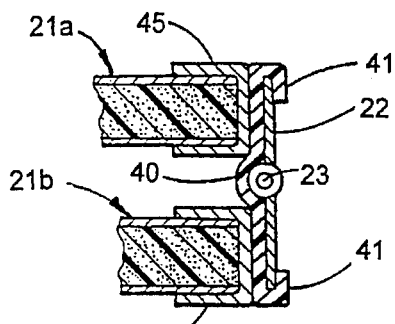
FIG. 13 is a fragmentary section view of one panel joint illustrating the structure when panels 21a, 21b are folded into an open position.
Figure 14:
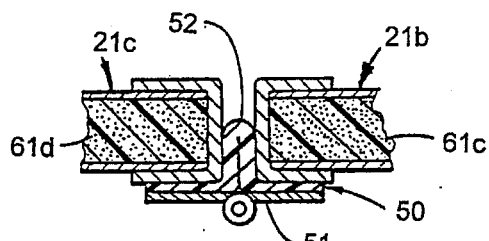
FIG. 14 is a fragmentary section view of a hinged joint where the hinge is on the interior of the cover when panels 21b, 21c are closed.

To further resist moisture penetration at the hinges between the panels, the hinges 22, which pivot about an axis which is exterior of the cover when the cover is extended and flat on the truck body, are covered by a flexible plastic jacket 40 (FIG. 13). FIG. 13 greatly exaggerates the space between the panels when they are folded for storage. This jacket preferably has reverse flanges 41 along its edges to seat over and around the ends of the leaves of the hinges 22. These flanges 41 positively anchor the longitudinal edges of the jacket to the hinge. This construction, coupled with the jacket being positioned between the leaves of the hinges and the panels to which the hinge is attached, provides a positive anchor for the jacket. It has been discovered that without this anchor, jacket 40, over a period of time due to opening and closing of the cover, may work its way out of the clamp between the hinge and the cover and ultimately cease to function as a watertight seal.

Figure 15:
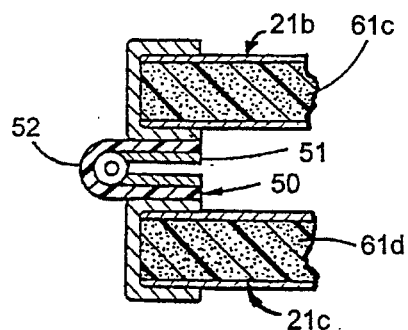
FIG. 15 is fragmentary section view of the hinge joint when panels 21b, 21c are folded in the open position.
Figure 16:
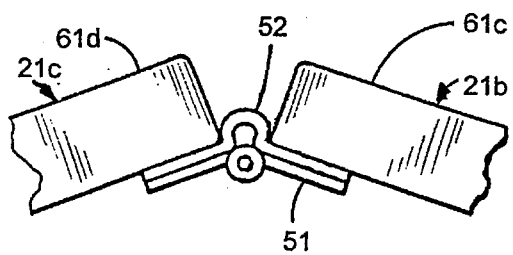
FIG. 16 is a fragmentary elevation view of the panels when pivoted to a partially opened or closed position.

The preceding description deals with the situation where one panel is folded up and over the other about a hinge pin which is external the cover when the cover is extended to enclose the cargo bay. A different arrangement exists when the panels are folded about a hinge which must have its pivot axis below the panel (FIGS. 14–16). In this panel joint, a flexible seal member 50 is mounted between the hinge 51 and the panels. The seal member 50 has a portion 52 which becomes wedged between the panels when the cover is in an extended position. In this position, it also becomes clamped between the panels when they are in an aligned position (FIG. 14). The manner in which the seal moves as the panels are folded is illustrated in FIG. 16.

Because hinge 51 extends inwardly from the panels when they are aligned, this hinge cannot extend to the ends of the panels where it would interfere with the panels laying flat on gasket 35 at sides 13 of the cargo bay (FIG. 10). To overcome this problem, where the hinge terminates, an inverted U-shaped gasket is provided. Since there is no hinge or other pressure creating medium in this area, a compressible member, such as a rubber gasket, is provided. This is bonded to one leg of gasket and is of a thickness such that when the panels are aligned, it is compressed.

Panels 21 are preferably of a laminar construction having inner and outer sheets 42 and 43 and a core 44 of rigid foam. The inner and outer sheets are preferably of aluminum and are bonded to the core. In the construction illustrated herein, each panel is surrounded by a C-shaped frame 45 which protects the edge of the core and adds further rigidity to the panels. Frame 45 can be secured by suitable adhesives to both the facing sheets and to the core, such as described in U.S. Pat. No. 4,844,531, having a thickness of from about ⅔ of an inch to slightly more than 1 inch.

Figure 17:
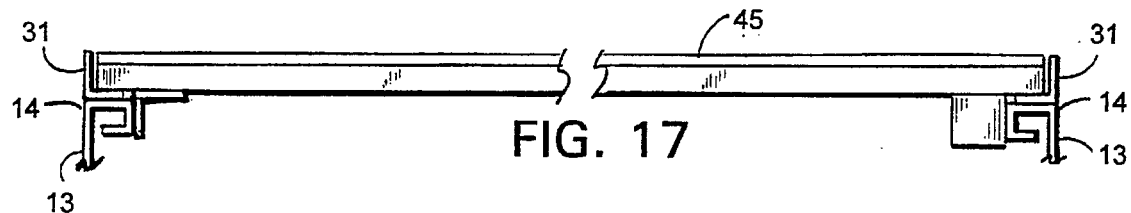
FIG. 17 illustrates one embodiment of an alignment/positioning device which prevents laterally acting forces from dislodging the cover.
Figure 18:
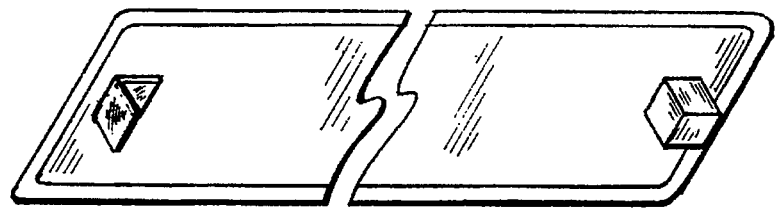
FIG. 18 illustrates another embodiment of an alignment/positioning device which prevents laterally acting forces from dislodging the cover.

At an opposite end of cover 20 from mounting bracket assembly 26 is a structure provided to maintain the alignment of cover 20 over cargo bay 12, and to prevent lateral shifting of panels 21a, 21b, 21c, or 21d between upright legs 31 of L-shaped angles 30 atop siderails 14. It is preferred that each structure include brackets, blocks, or shims 46 attached to the bottom 61 of panel 21a and/or 21d at points which position the shims 46 immediately or substantially close to the inside surfaces of siderails 14. With shims 46 adjacent the inner surface of opposing siderails, cover 20 is centered over bay 12. In a preferred embodiment, shims 46 are formed from angle iron wherein one flange 47 is secured to surface 48 of panel 21a by a fastener, and the depending flange 49 is oriented such that the flange is substantially parallel to the inner edge 56 of each siderail. A slight, inward arc or bow may be formed in each flange 49 to permit the tip of each flange to clear the siderail and to allow the outer surface to ramp against each siderail (FIGS. 17 and 18). Alternatively, the L-shaped brackets may be substituted by blocks 57 (FIGS. 17 and 18) having radiused corners and sides to produce the same results.

Figure 19:
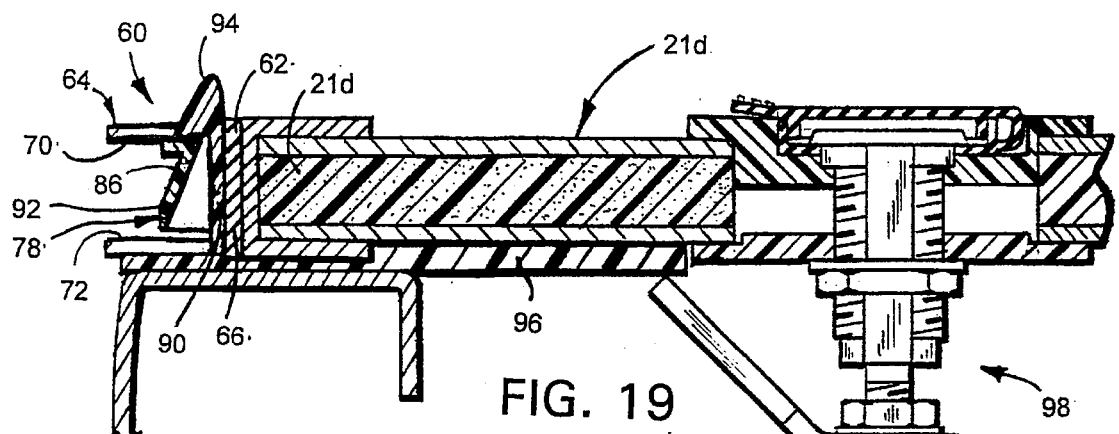
FIGS. 19 and 20 provide a fragmentary section and exploded views, respectively, of one embodiment of a latching mechanism located in FIG. 2 by reference XIX for keeping the panels in a closed position.
Figure 20:
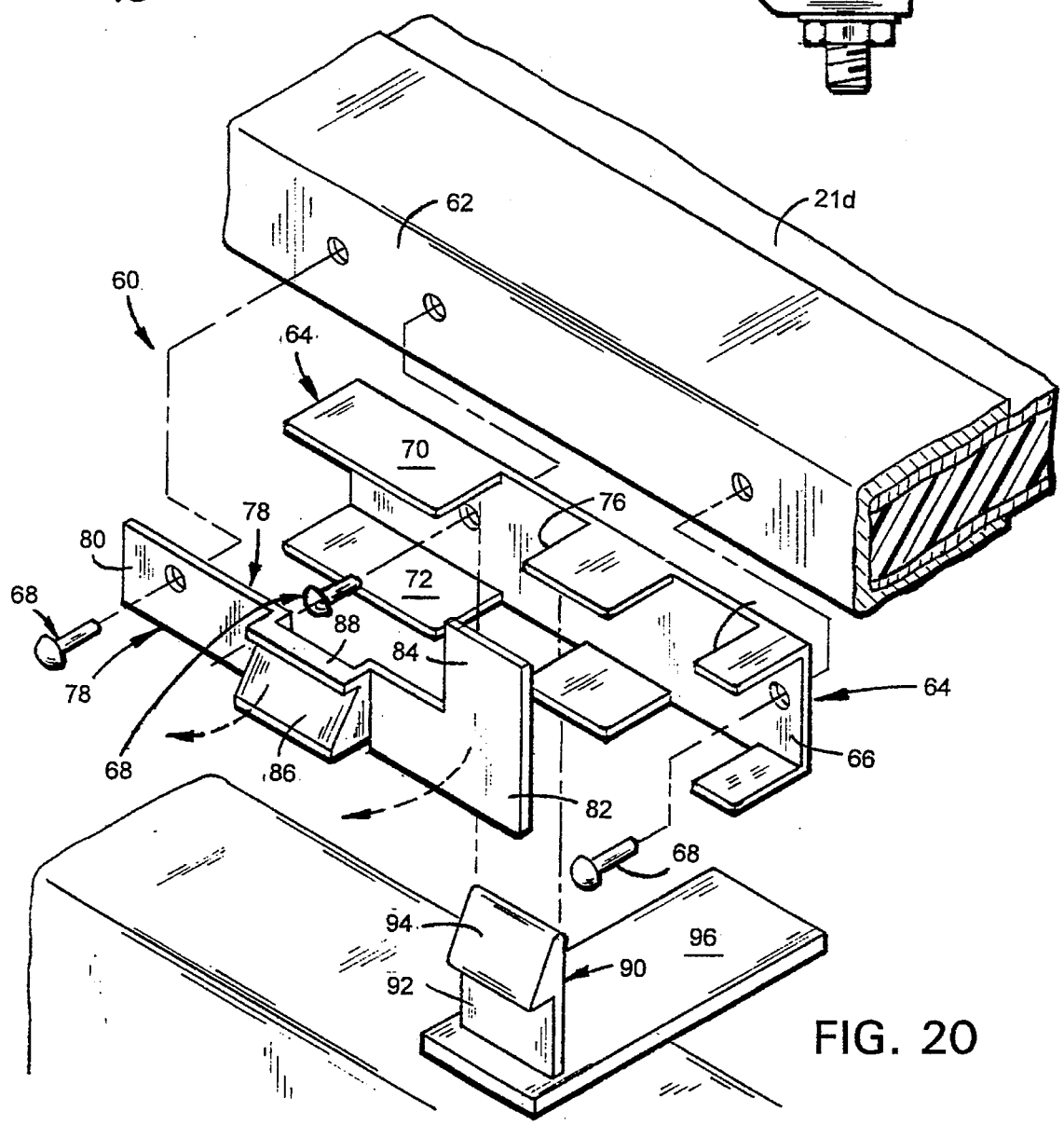

One of the advantages provided by this invention is that front panel 21d is not fixed in place, but rather may be opened. To provide easy access through the panel, yet providing a secure and tight closure of the panel lid, a latch assembly 60 is provided along an edge 62, most preferably proximate cab 11 (FIGS. 19 and 20). In one embodiment latch 60 includes a C-shaped section of channel 64 having a bottom wall 66 attached to panel edge 62 by fasteners 68. Channel sidewalls 70, 72 have portions 74, 76 removed or notched out for reasons which will become apparent below. The depth of the notches may vary, although it is preferred that they extend substantially to bottom wall 66. Received in channel 64 adjacent to bottom wall 66 is a molded lever spring 78 or similarly acting structure having a first end 80 fixed in place against bottom wall 66 by one or more fasteners, such as 68 described above. The opposite end 82 is free such that a portion of the spring may move perpendicular to bottom wall 66. In its resting position, spring 78 lies adjacent bottom wall 66. Spring 78 preferably includes a tab 84 defined thereon which extends up through notch 74 in sidewall 70 to enable the user to deflect spring 78 away from bottom wall 66. Additionally, spring 78 includes a generally rectangular arch 86 which is located coincidentally with notches 76 in sidewalls 70, 72. Arch 86 includes a sloping wall and is configured to define a passage 88 between spring 78 and bottom wall 66 adapted to receive a stake 90 extending upwardly from siderail 14. In a preferred embodiment, spring 78 is molded from a polycarbonate plastic. A steel spring may be combined with the molded spring to provide additional strength and resiliency. Stake 90 is preferably made from a metal or plastic tab 92 having a barbed detent 94 at its upper end. The spring arch 86 is designed to receive stake 90 in sloped passage 88 and ramp over detent 94 when panel 21d is closed such that arch 86 clamps over detent 94 and comes to rest adjacent tab 92 to latch panel 21d in a closed position. To open panel 21d, the operator grabs tabs 84 and swings spring 78 away from stake 90 to clear arched portion 86 from detent 94. The panel may then be lifted or rotated to the open position. In the preferred embodiment, stake 90 extends from a horizontal tab 96 which catches one end of a locking mechanism generally shown as 98 and extending through panel 21d. Another locking device 98 may be provided on panel 21a in a similar fashion to securely lock cover 21a in place. For example, locks 98 may include a variety of locking mechanisms, although it is preferred that they be substantially flush with the top of each panel section and have a protective cover to prevent the pooling of water and debris therein which could affect the operation.

Having described a preferred embodiment of this invention and various modifications thereof, it will be understood that other modifications of this invention can be made. Such modifications are to be considered as included in the hereinafter appended claims unless the language thereof specifically excludes them.

We claim:

1. A cargo bay cover for a cargo bay of a pickup truck, comprising in combination:
   at least first and second cargo bay panels arranged generally parallel to each other, each configured to span the cargo bay of the pickup truck with opposite ends resting on opposite sidewalls of the cargo bay;
   a hinge interconnecting said first and second cargo bay panels in a manner such that said first and second cargo bay panels can be rotated about said hinge and folded onto the other of said first and second cargo bay panels; and a bracket assembly interconnecting said hinge to said opposite sidewalls of the cargo bay for retaining said first and second cargo bay panels above the cargo bay, said bracket assembly having at least one flange pivotally depending from said hinge proximate to, and securely fastened to, at least one of said sidewalls.

2. The cargo bay cover as defined by claim 1, further including a shim assembly attached to a lower surface of at least one of said first and second cargo bay panels, and adapted to align said first and second cargo bay panels with respect to said sidewalls.

3. The cargo bay cover as defined by claim 2, further including a seal disposed between said hinge and said at least first and second cargo bay panels to form a generally watertight seal therebetween.

4. The cargo bay cover as defined by claim 2, further including:

a bracket disposed on at least one of the opposite sidewalls; and a seal attached to said bracket and configured to form a seal along one end of said at least said first and second panels.

5. The cargo bay cover as defined by claim 4, wherein said seal on said bracket includes at least one generally upright flange configured to engage said at least said first and second panels.

6. The cargo bay cover as defined in claim 4, wherein said bracket includes an upright leg located substantially adjacent said one end of said at least said first and second panels, and acts as a wind break for said panels.

7. The cargo bay cover as defined by claim 2, wherein said shim assembly includes at least one angled bracket located on one of said panels, a downwardly depending arm of said at least one angled bracket being located proximate to or engaging an inside surface of one of the sidewalls to prevent said first and second cargo bay panels from moving transversely thereto.

8. The cargo bay cover as defined in claim 1, further including a spring latch assembly disposed along one end of said first cargo bay panel to detachably couple said first cargo bay panel in a closed position over the cargo bay.

9. The cargo bay cover as defined in claim 1, wherein said bracket assembly further includes:

at least one mounting bracket extending from said at least one of said opposite sidewalls; and a fastener interconnecting said at least one flange to said at least one mounting bracket such that said hinge is fixed with respect to said one of said opposite sidewalls.

10. A cover assembly for a bed of a pickup truck, the bed having at least two opposing sidewalls, the cover assembly comprising in combination:

a plurality of panels arranged generally parallel to each other, each dimensioned to span the bed with one end resting on one of the sidewalls;

adjacent ones of said plurality of panels interconnected to each other by a hinge to enable said plurality of panels to rotate about said hinge;

at least one bracket interconnecting said hinge to one of the sidewalls to retain said cover assembly over said bed; and a locating assembly attached to at least one of said plurality of panels for reducing transverse movement of said plurality of panels over said bed, said locating assembly having at least one of a block and a bracket located proximate one of said sidewalls.

11. The cover assembly as defined in claim 10, further including a spring latch for closing at least one of said plurality of panels over the bed of the pickup truck.

12. The cover assembly as defined in claim 10, further including:

an angled bracket disposed on a top of and extending a length of one of the sidewalls co-extensive with the cover assembly, for partially concealing one of the ends of said panels; and a seal mounting on said angled bracket and adapted to engage the ends of said panels to form a seal therewith.

13. The cover assembly as defined in claim 10, further including a seal disposed between each said hinge and said adjacent ones of said panels to provide a generally watertight seal therebetween.

14. The cover assembly as defined in claim 10, wherein said at least one bracket includes:

a mounting plate attached to an inner surface of the one sidewall thereof;

an angle iron extending outwardly from said mounting plate;

a flange pivotally depending from said hinge proximate said bracket; and a coupler interconnecting said flange to said angle iron.

15. The cover assembly as defined in claim 10, wherein said bracket includes:

a flange depending from said hinge and configured to rotate independent of said hinge, said flange being angled to provide a portion proximate to and generally parallel with an inner surface of the one sidewall thereof; and a coupler interconnecting said portion to the one sidewall thereof.

16. A foldable cover for a bed of a pickup truck, comprising in combination:

a plurality of panels arranged substantially parallel to each other, each configured to span a distance between opposite siderails of the pickup bed;

a hinge pivotally interconnecting adjacent ones of said plurality of panels in a manner such that said plurality of panels can be folded from a generally planar configuration against one another;

at least one said hinge having a pair of flanges depending therefrom, each flange disposed proximate one of said siderails;

a coupler interconnecting each of said flanges to one of said siderails; and at least one positioning member attached to one of said plurality of panels for engaging said one siderail thereof and reducing transverse movement of the foldable cover over the bed.

17. The foldable cover as defined in claim 16, further including a latching mechanism attached to at least one of said plurality of panels to detachably close said first and last panels over the bed.

18. The foldable cover as defined in claim 16, wherein all of said panels are foldable about one of said hinges.

19. The foldable cover as defined in claim 16, wherein said at least one positioning member includes one of an angled bracket or a block attached to a lower surface of said one of said panels.

20. The foldable cover as defined in claim 19, further including a locking mechanism in at least one of said plurality of panels for locking said panels in a closed position.

* * * * *